United States Patent
Sun et al.

(10) Patent No.: US 7,457,407 B2
(45) Date of Patent: Nov. 25, 2008

(54) MOBILE PHONE AND BATTERY-FIXING DEVICE THEREOF

(75) Inventors: Chin-Kai Sun, Banciao (TW); Shun-Fan Cheng, Kaohsiung (TW)

(73) Assignee: Qisda Corporation, Taoyuan County (TW)

( * ) Notice: Subject to any disclaimer, the term of this patent is extended or adjusted under 35 U.S.C. 154(b) by 706 days.

(21) Appl. No.: 10/927,386

(22) Filed: Aug. 26, 2004

(65) Prior Publication Data

US 2005/0058284 A1   Mar. 17, 2005

(30) Foreign Application Priority Data

Sep. 3, 2003   (TW) ............................... 92215915 U

(51) Int. Cl.
*H04M 1/00* (2006.01)
*H04M 9/00* (2006.01)

(52) U.S. Cl. ............................ 379/433.08; 379/433.01

(58) Field of Classification Search ............ 379/428.01, 379/433.01, 433.08; 455/571–574, 575.1, 455/90.3, 550.1; 429/96, 97, 98–100
See application file for complete search history.

(56) References Cited

U.S. PATENT DOCUMENTS

| | | | |
|---|---|---|---|
| 4,912,602 A * | 3/1990 | Zurek et al. | 361/752 |
| 5,916,698 A * | 6/1999 | Diederiks et al. | 429/1 |
| 6,455,188 B1 * | 9/2002 | McKay et al. | 429/97 |
| 2006/0115715 A1 * | 6/2006 | Ge et al. | 429/97 |

* cited by examiner

*Primary Examiner*—Curtis Kuntz
*Assistant Examiner*—Phylesha L Dabney

(57) ABSTRACT

A mobile phone and a battery-fixing device. The mobile phone comprises a body, a battery, and a positioning device. The body includes a first guiding member. The battery is disposed on the body in a detachable manner, and includes a second guiding member corresponding to the first guiding member. The battery moves in the body by the second guiding member moving along the first guiding member. The positioning device is disposed on the body, and fixes the battery in the body.

8 Claims, 9 Drawing Sheets

MOBILE PHONE AND BATTERY-FIXING DEVICE THEREOF

BACKGROUND OF THE INVENTION

1. Field of the Invention

The invention relates to a mobile phone and a device for fixing a battery therein; in particular, the invention relates to a mobile phone receiving a battery from the bottom.

2. Description of the Related Art

In conventional mobile phones, batteries are fixed within the chassis or structure of the phone, normally within the housing of a phone, or beneath a dedicated cover.

To fix the battery, some form of fixing mechanism, such as a knob, is normally employed. Disposition of this mechanism is an important design consideration, and can often compromise appearance and efficient function of the phone. Additionally, to enhance the strength of the structure, a wall is formed at the bottom portion of the mobile phone. However, space inside the mobile phone is also limited due to arrangement of the wall.

SUMMARY OF THE INVENTION

In view of this, the invention provides a mobile phone receiving a battery from the bottom.

Another purpose of the invention is to provide a battery-fixing device that can optimize internal space of an electronic device.

Accordingly, the invention provides a mobile phone comprising a body, a battery, and a positioning device. The body includes a first guiding member. The battery is disposed on the body in a detachable manner, and includes a second guiding member corresponding to the first guiding member. The battery moves in the body by the second guiding member moving along the first guiding member. The positioning device is disposed on the body, and fixes the battery on the body.

In a preferred embodiment, the positioning device fixes the battery in a predetermined direction, and a predetermined angle is formed between the predetermined direction and a direction along which the battery moves.

Additionally, the body includes an U-shaped frame including a first side, a second side connecting to the first side, and a third side connecting to the second side. The positioning device is located on the first or third side, and is integrally formed on the body.

Furthermore, the positioning device includes a connecting portion, a pivoting portion, and a first engaging portion. The connecting portion is connected to the body. The pivoting portion is connected to the connecting portion, and pivots relative to the body. The first engaging portion is disposed on the pivoting portion, and fixes the battery. The battery includes a second engaging portion corresponding to the first engaging portion. The first engaging portion is a protrusion, and the second engaging portion is a concave portion.

Moreover, the positioning device comprises a connecting member, an engaging member, and a torsional spring. The connecting member is disposed on the body. The engaging member is connected to the connecting member, and fixes the battery. The torsional spring is disposed on the connecting member, and is abutted by the engaging member. The engaging member is maintained in a predetermined position by the torsional spring. The battery is formed with a concave portion corresponding to the engaging member.

In another preferred embodiment, the positioning device is a magnet, and the battery includes an attracted portion corresponding to the magnet.

Furthermore, the mobile phone further comprises an elastic member disposed on the second side of the frame to eject the battery. The battery includes a concave portion corresponding to the elastic member.

In another preferred embodiment, the number of the positioning device is two. One of the positioning devices is located on the first side of the frame, and the other positioning device is located on the third side of the frame. The mobile phone further comprises a transmitting member disposed on the body, and the transmitting member connects the positioning devices such that all positioning devices move together. The transmitting member is formed with a receiving portion on the second side of the frame, and the battery includes a protrusion corresponding to the receiving portion. The body includes a first connector on the first or third side, and the battery includes a second connector corresponding to the first connector.

Furthermore, the body comprises a first connector on the second side, and the battery comprises a second connector corresponding to the first connector. The first guiding member is a flange, and the second guiding member is a groove.

In the invention, a device for fixing a battery of an electronic device is provided. The electronic device comprises a body and a battery disposed in the body in a detachable manner. The device comprises a first guiding member, a second guiding member, and a positioning device. The first guiding member is integrally formed on the body. The second guiding member is integrally formed on the battery. The battery moves in the body by moving the second guiding member along the first guiding member. The positioning device is disposed on the body, and fixes the battery in the body.

BRIEF DESCRIPTION OF THE DRAWINGS

The present invention can be more fully understood by reading the subsequent detailed description and examples with references made to the accompanying drawings, wherein:

FIG. 2a is a cross section of a body in FIG. 1a;

FIG. 2b is a cross section of a battery in FIG. 1a;

FIG. 2c is a partially enlarged view of the battery in FIG. 1a;

FIGS. 3a-3b are partially enlarged views of the body in FIG. 1a;

FIGS. 4a-4b are schematic views of a combination of the body and the battery in FIG. 1a;

FIGS. 6a-6b are schematic views of a positioning device in FIG. 5a;

FIGS. 7a-7b are schematic views of a transmitting member in FIG. 5a and

DETAILED DESCRIPTION OF THE INVENTION

First Embodiment

Figure 1A:
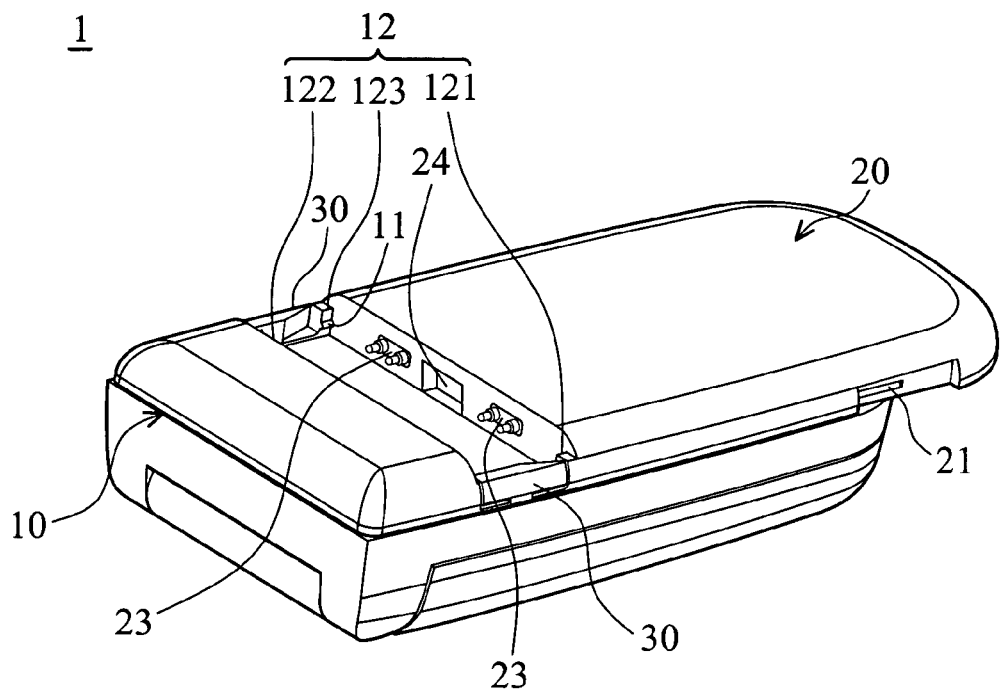
FIGS. 1a-1b are schematic views of a mobile phone as disclosed in a first embodiment of the invention.
Figure 1B:
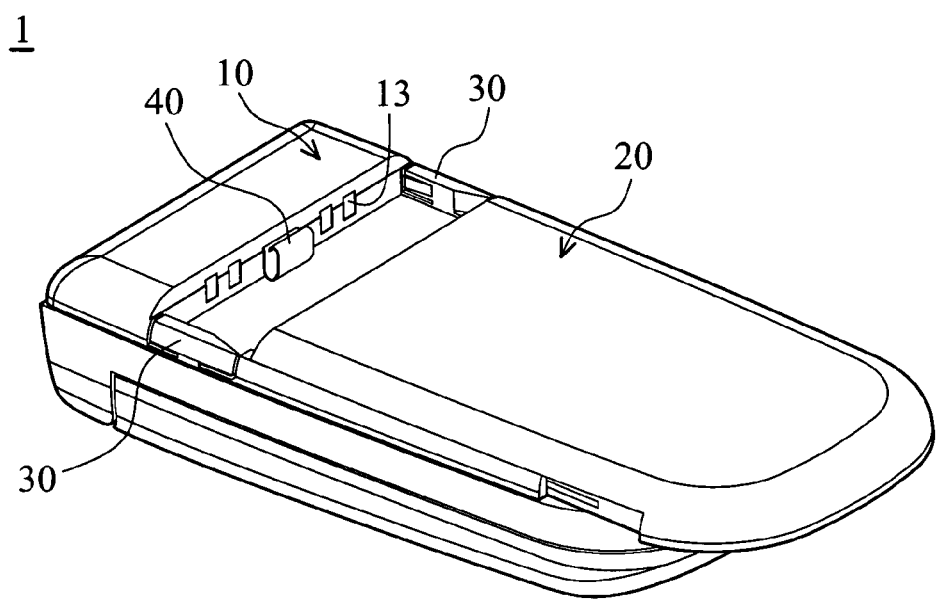

FIGS. 1a-1b are schematic views of a mobile phone 1 as disclosed in a first embodiment of the invention. The mobile phone 1 comprises a body 10, a battery 20, and two positioning devices 30.

Figure 2A:
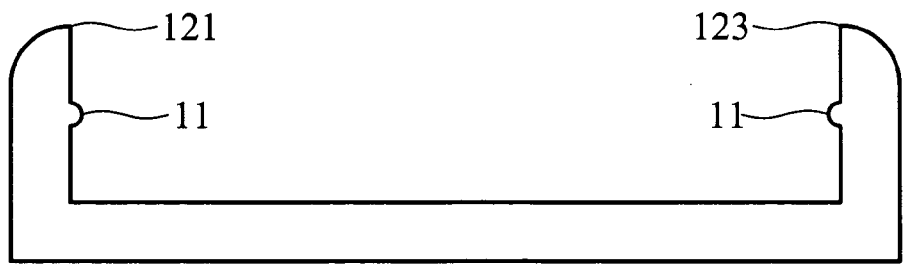

The body 10 is a basic component of the mobile phone 1, and comprises two first guiding members 11, an U-shaped frame 12, and two first connectors 13. The frame 12 includes a first side 121, a second side 122 connecting to the first side 121, and a third side 123 connecting to the second side 122. One of the positioning devices 30 is located on the first side 121, and the other positioning device 30 is located on the third side 123. As shown in FIG. 2a, one of the first guiding members 11 is located on the first side 121, and the other first guiding member 11 is located on the third side 123. The first guiding member 11 is a semi-circular flange to guide the battery 20 to move in the body 11.

Figure 2B:
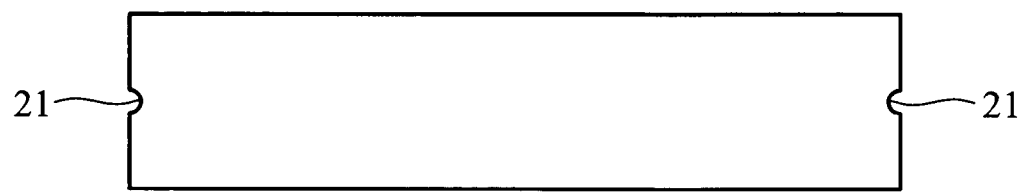
Figure 2C:
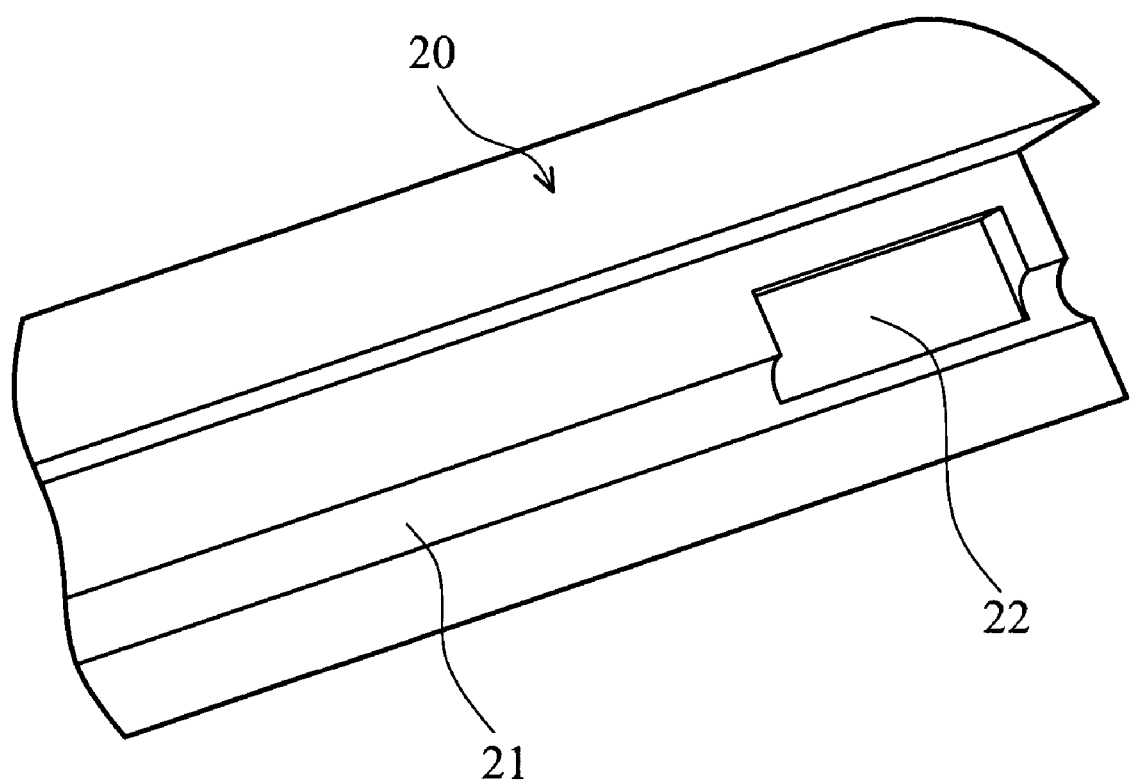

As shown in FIG. 1b, the first connectors 13 are disposed on the second side 122 of the frame 12. The battery 20 is disposed on the body 10 in a detachable manner, and provides power required by the mobile phone 1. As shown in FIG. 2b, the battery 20 includes two second guiding members 21, corresponding to the first guiding members 11, on both sides. The second guiding member 21 is a semi-circular groove. The battery 20 can move in the body 10 by moving the second guiding members 21 along the first guiding members 11. As shown in FIG. 2c, the battery 20 includes a second engaging, concave portion 22. Additionally, as shown in FIG. 1a, is the battery 20 comprises two second connectors 23 corresponding to the first connectors 13.

Figure 3A:
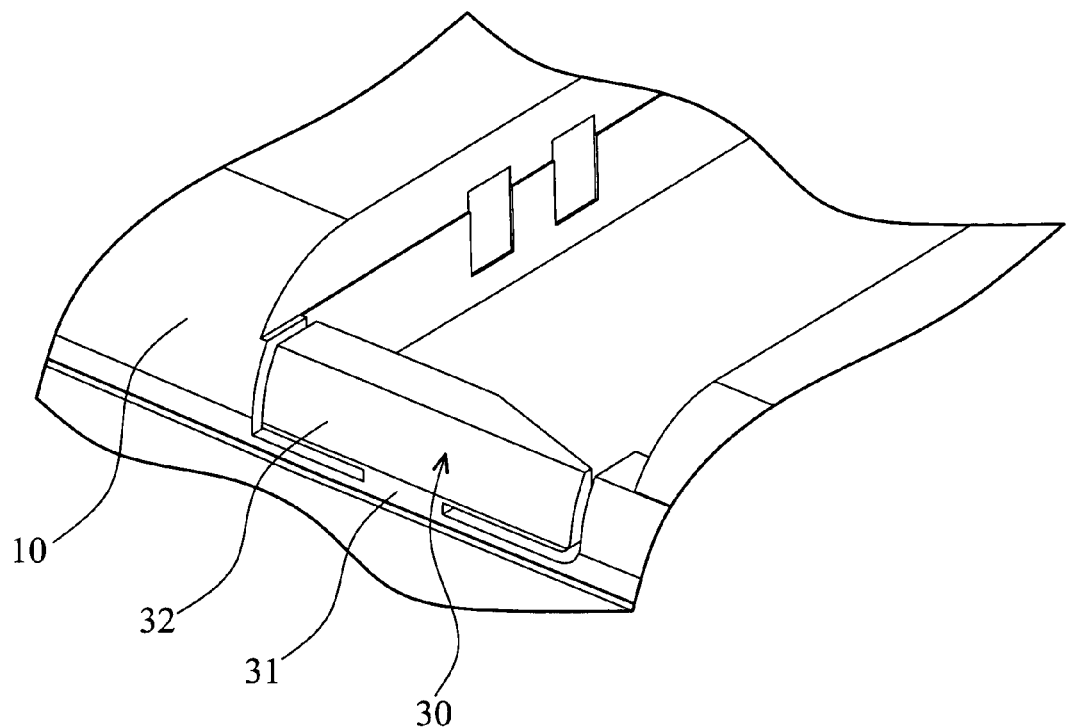
Figure 3B:
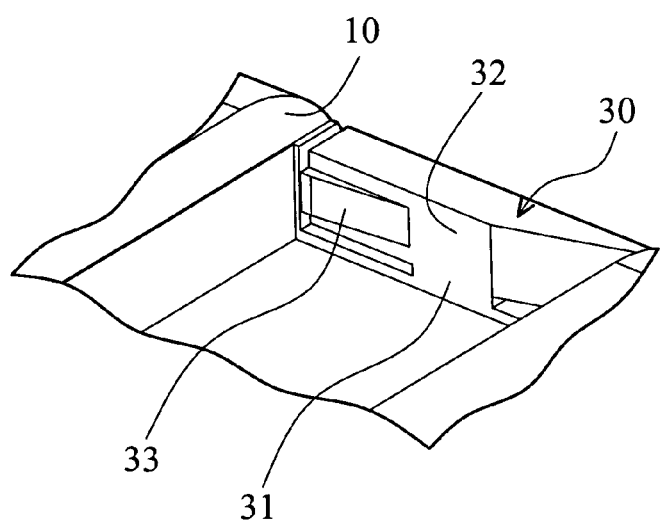

One of the positioning devices 30 is integrally formed on the first side 121 of the frame 12 of the body 10, and the other positioning device 30 is integrally formed on the third side 123 of the frame 12 of the body 10. The positioning devices 30 fix the battery 20 in the body 10. Referring to FIGS. 3a-3b, the positioning device 30 includes a connecting portion 31, a pivoting portion 32, and a first engaging portion 33. The connecting portion 31 is connected to the body 10. The pivoting portion 32 is connected to the connecting portion 31, and slightly pivots relative to the body 10. The first engaging portion 33, corresponding to the second engaging portion 22, is a tapered protrusion, and is disposed on the pivoting portion 32. The battery 20 is fixed in the body 10 by way of the first engaging portion 33 engaging the second engaging portion 22.

As stated above, since the positioning devices 30 are located on the first side 121 and the third side 123 of the frame 12, space occupied by a conventional knob located at the center of the body is freed. Additionally, the positioning devices 30 fix the battery 20 in a predetermined direction different from that in which the battery 20 moves. That is, a predetermined angle is formed between the predetermined direction and the moving direction of the battery 20.

It is understood that the strength of the frame may be weakened due to the positioning devices. Specifically, since the positioning devices 30 are formed on the frame 12 of the body 10, part of the frame 12 is used to form the positioning devices. Thus, to enhance the strength of the frame 12, the frame 12 and the positioning devices 30 are preferably formed on different components of the body 10 during manufacture. Alternatively, the frame 12 and the positioning devices 30 are preferably made of material with higher rigidity.

As shown in FIG. 1b, the mobile phone 1 further comprises an elastic member 40 disposed on the second side 122 of the frame 12. Thus, when the battery 20 is removed from the body 10, it is ejected by the elastic member 40. As shown in FIG. 1a, the battery 20 includes a concave portion 24, corresponding to the elastic member 40, on its top portion. Thus, when the battery 20 is fixed in the body 10, the elastic member 40 is located in the concave portion 24 so that the appearance of the entire mobile phone 1 can be maintained as a whole.

Figure 4A:
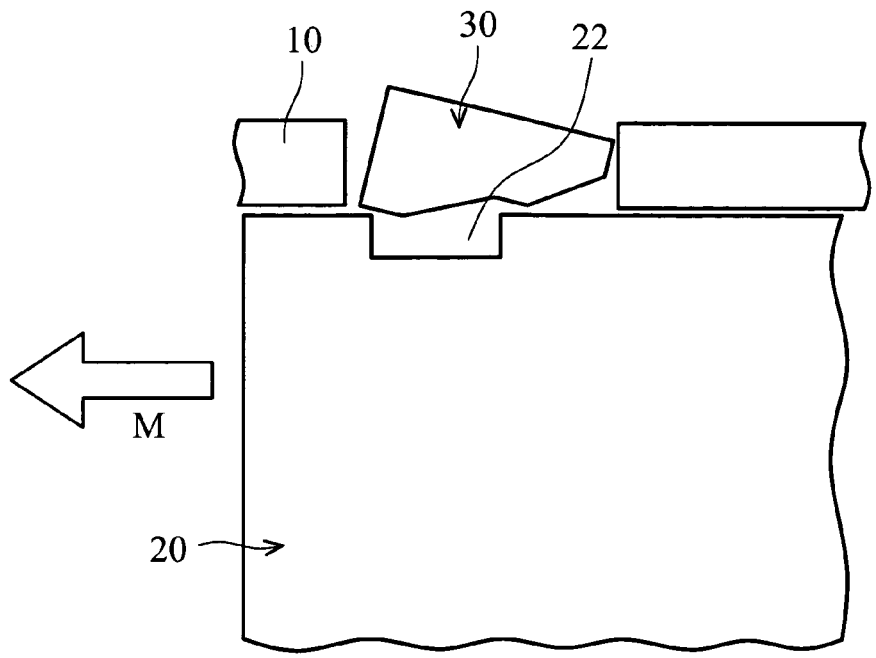
Figure 4B:
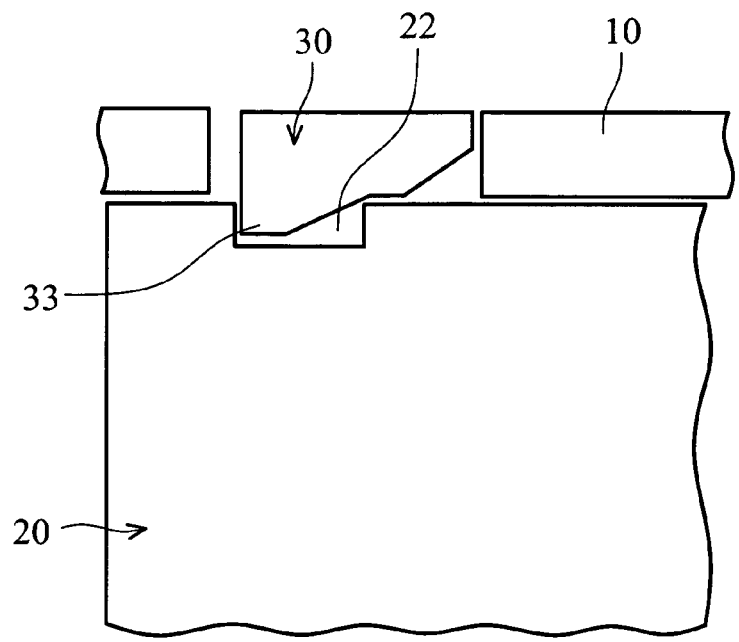

For installation into the body 10, the battery 20 is moved in the direction indicated by arrow M in FIG. 4a. The battery 20 is pushed upward from the bottom of the body 10 until contacting the positioning device 30. At this time, the positioning device 30 is slightly deformed as shown in FIG. 4a. The battery 30 is then further pushed until the second engaging portion 22 engages the first engaging portion 33 as shown in FIG. 4b. The positioning device 30 then returns to its original shape while the second connectors 23 are coupled to the first connectors 13.

To remove the battery 20 from the body 10, the positioning device 30 is pressed to be slightly deformed. At this time, the first engaging portion 33 is disengaged from the second engaging portion 22, and the battery 20 is ejected by the elastic member 40. The battery 20 is completely removed.

It is understood that the second connectors 23 can assist in the removal of the battery 20 due to elasticity.

As stated above, since the positioning devices 30 are located on the first side 121 and the third side 123 of the frame 12, space occupied by the conventional knob located at the center of the body is freed. Additionally, since no wall is formed on the bottom of the body, the battery can be inserted into the body upwardly, thus enlarging the space in the body and the battery.

Second Embodiment

Figure 5A:
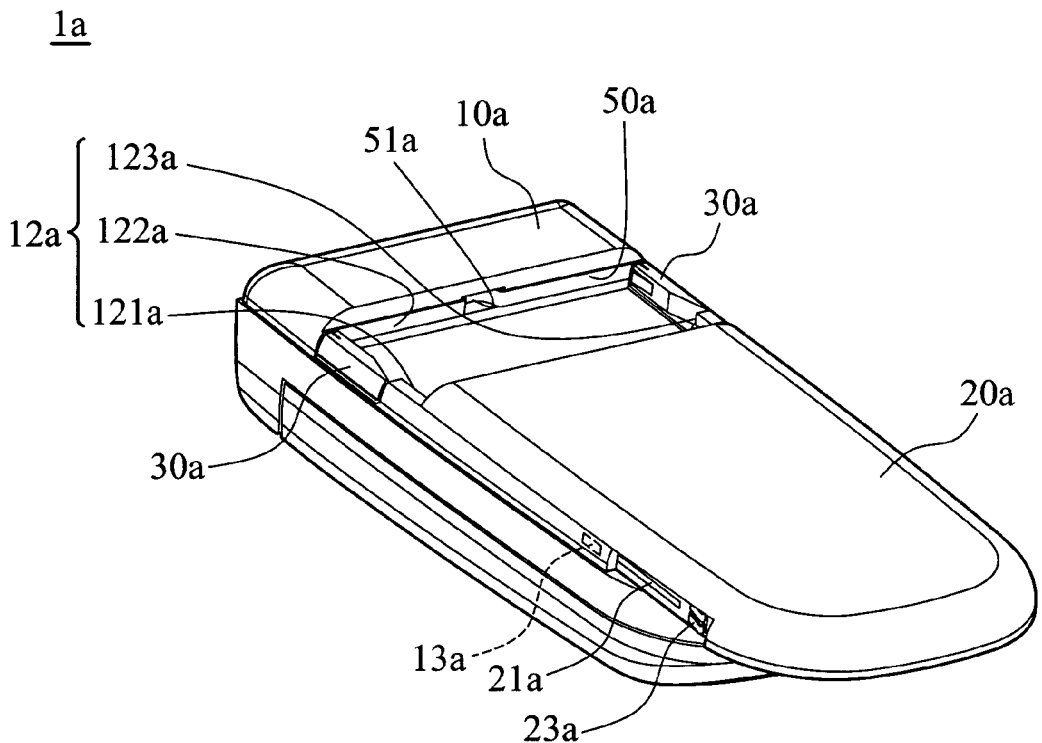
FIGS. 5a-5b are schematic views of a mobile phone as disclosed in a second embodiment of the invention.
Figure 5B:
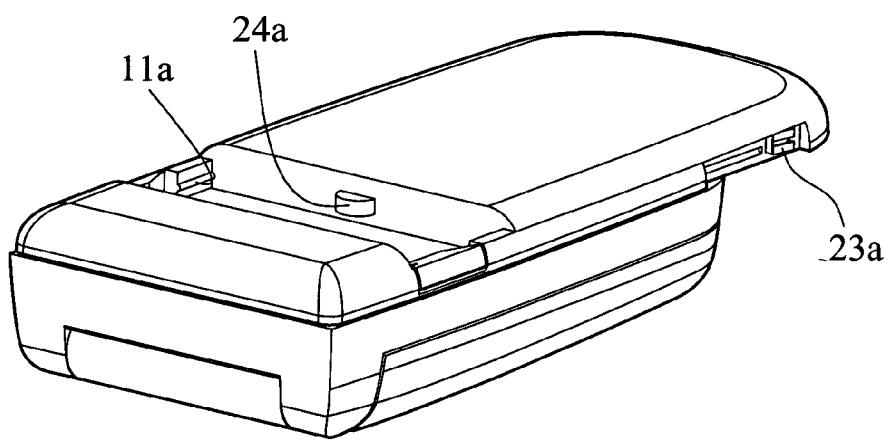

FIGS. 5a-5b are schematic views of a mobile phone 1a as disclosed in a second embodiment of the invention. The mobile phone 1a comprises a body 10a, a battery 20a, and two positioning devices 30a.

The body 10a comprises two first guiding members 11a, a U-shaped frame 12a, and two first connectors 13a. The frame 12a includes a first side 121a, a second side 122a connecting to the first side 121a, and a third side 123a connecting to the second side 122a. One of the positioning devices 30a is located on the first side 121a, and the other positioning device 30a is located on the third side 123a. Also, the first guiding members 11a and the first connectors 13 are disposed on the first side 121a and the third side 123a of the frame 12. It is noted that the first connector 13a on the first side 121a is shown by a dash line in FIGS. 5a-5b.

The battery 20a is disposed on the body 10a in a detachable manner, and comprises two second guiding members 21a, corresponding to the first guiding member 11a, on both sides. As shown in FIG. 6b, the battery 22a includes a concave engaging portion 22a. Additionally, as shown in FIG. 5a, the battery 20a comprises two second connectors 23a corresponding to the first connectors 13a. It is noted that only one of the second connectors 23a is shown in FIGS. 5a-5b.

Figure 6A:
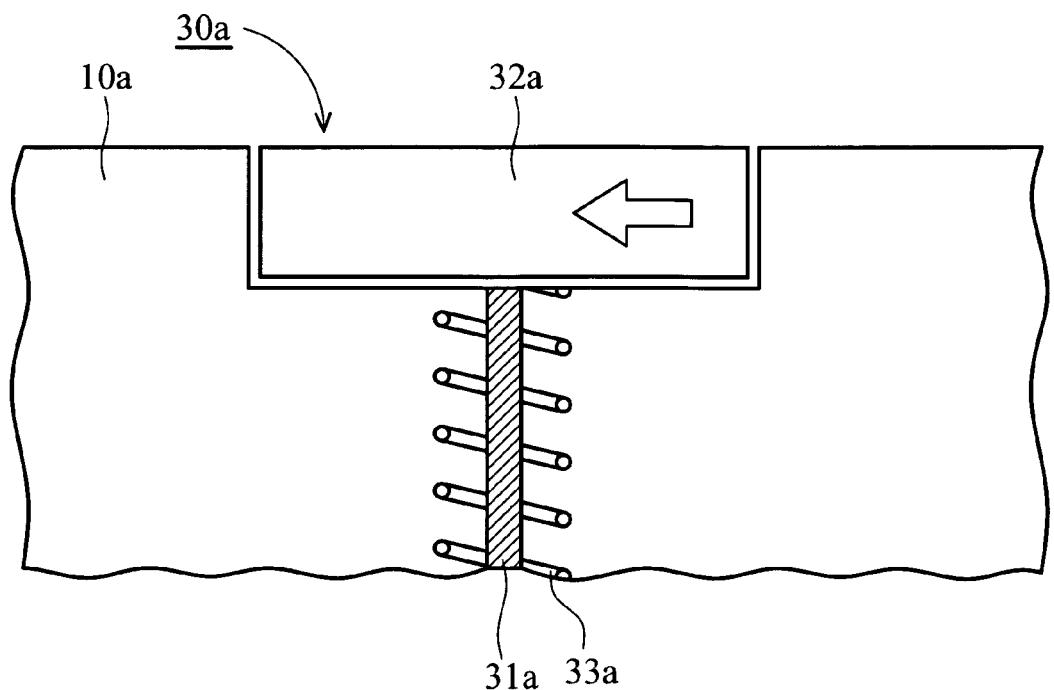
Figure 6B:
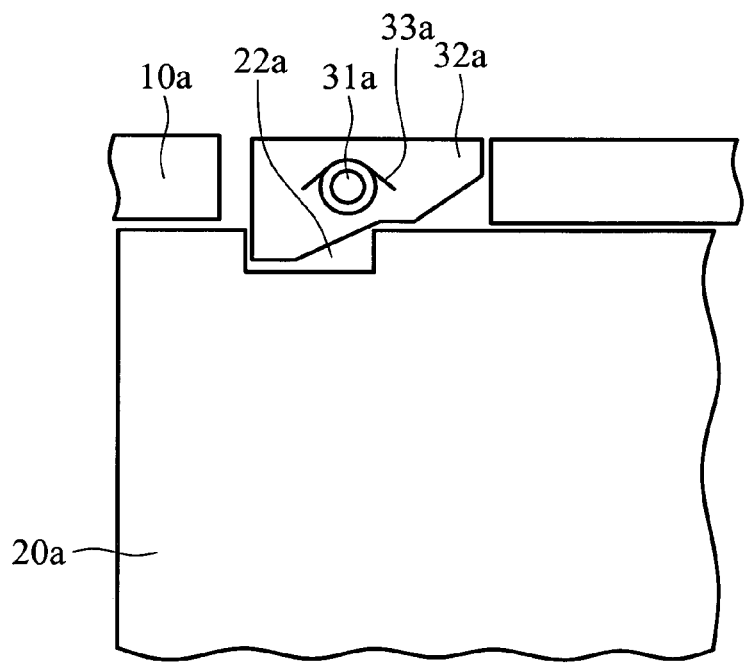

As shown in FIGS. 6a-6b, the positioning device 30a comprises a connecting member 31a, an engaging member 32a, and a torsional spring 33a. The connecting member 31a is disposed on the body 10a. The engaging member 32a is connected to the connecting member 31a, and fixes the battery 20a. The torsional spring 33a is disposed on the connecting member 31a, and is abutted by the engaging member 32a.

The engaging member 32a is maintained in a predetermined position by the torsional spring 33a.

Figure 7A:
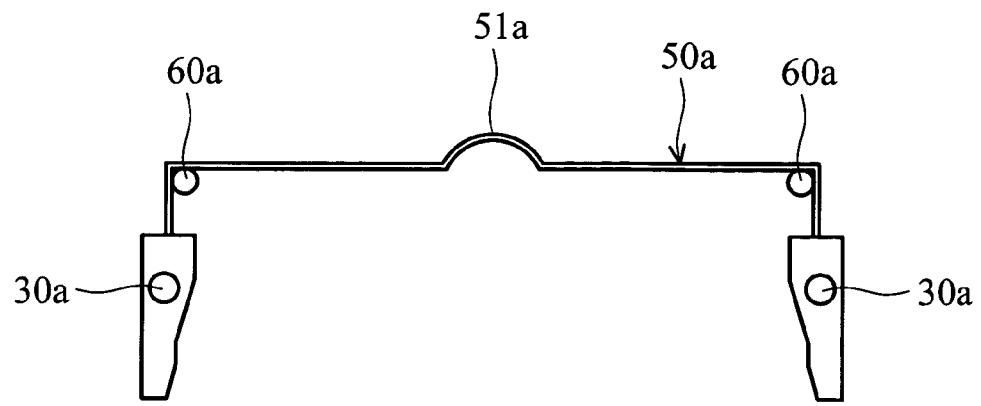

As shown in FIG. 5a, the mobile phone 1a further comprises a transmitting member 50a disposed on the frame 12a of the body 10. The transmitting member 50a connects the positioning devices 30a such that all positioning devices 30a move together as shown in FIGS. 7a-7b.

The transmitting member 50a is made of deformable material, and is formed with a receiving portion 51a on the second side 122a of the frame 12a. The battery 20a includes a protrusion 24a corresponding to the receiving portion 51a. Additionally, the body 10a includes posts 60a at corners of the frame 12a so that the transmitting member 50a can move the positioning devices 30a.

For installation into the body 10a, the battery 20a is pushed upward from the bottom of the body 10a until the engaging portion 22a contacts the engaging member 32a. At this time, the engaging member 32a rotates by the elastic force of the torsional spring 33a, and then engages the engaging portion 22a. The engaging member 32a then returns to its original position by the transmitting member 50a.

Figure 7B:
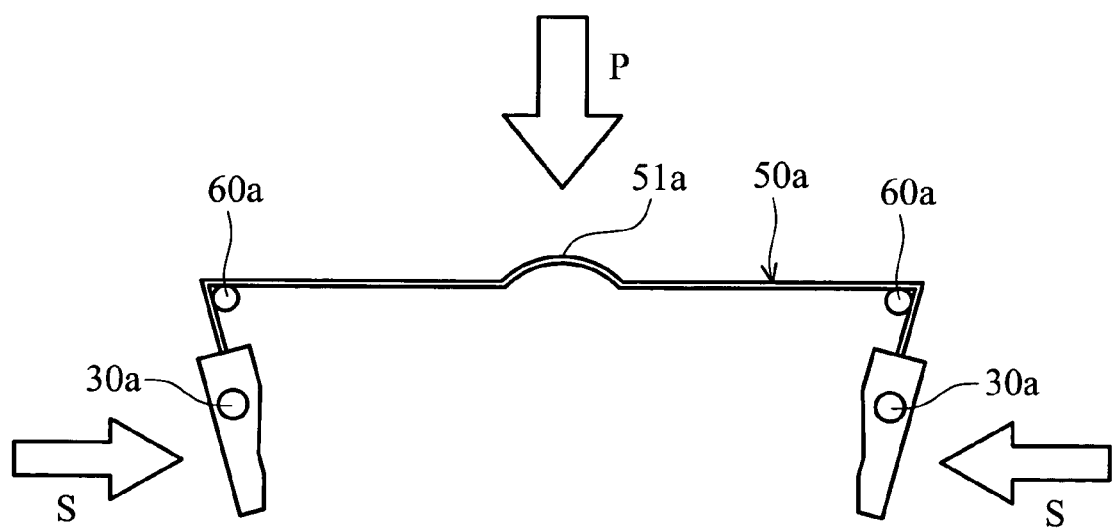

To remove the battery 20a from the body 10a, the engaging member 32a of the positioning device 30a is pressed from a position shown by an arrow s in FIG. 7b by way of a force exceeding the elastic force of the torsional spring 33a. At this time, the engaging member 32a is disengaged from the engaging portion 22a, and the transmitting member 50a is extended toward the first side 121a and the third side 123a. As shown by arrow p in FIG. 7b, the battery 20a is ejected by the receiving portion 51a pushing the protrusion 24a. The battery 20a is completely removed.

Third Embodiment

Figure 8:
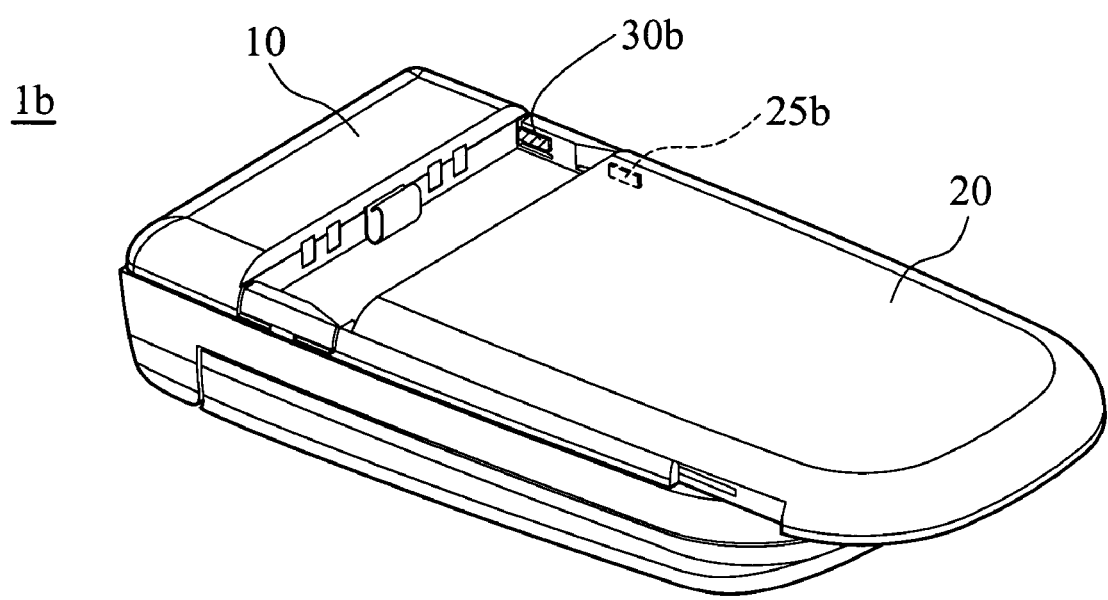
FIG. 8 is a schematic view of a mobile phone as disclosed in a third embodiment of the invention.

FIG. 8 is a schematic view of a mobile phone 1b as disclosed in a third embodiment of the invention. The mobile phone 1b comprises a body 10, a battery 20, and two positioning devices 30b. It is noted that the components in this embodiment, which are the same as those in the first embodiment are presented by the same references, such that their description is omitted.

The positioning device 30b is a magnet, and the battery 20a includes an attracted portion 25b corresponding thereto. The battery 20 is fixed in the body 10 by way of the magnet 30b attracting the attracted portion 25b.

It is understood that the attracted portion 25b is made of a material, such as metal, that can be attracted to the magnet.

The assembly/disassembly of the battery in this embodiment is similar to that of the first embodiment, and description thereof is thus omitted.

While the invention has been described by way of example and in terms of the preferred embodiment, it is to be understood that the invention is not limited to the disclosed embodiment. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A mobile phone comprising:
    a body including a first guiding member, wherein the body includes an U-shaped frame including a first side, a second side connecting to the first side, and a third side connecting to the second side;
    a battery, disposed on the body in a detachable manner, including a second guiding member corresponding to the first guiding member, wherein the battery moves in the body by moving the second guiding member along the first guiding member; and
    a positioning device, disposed on the body, for fixing the battery in the body, wherein the positioning device is located on the first side or the third side, the positioning device is a magnet, and the battery includes an attracted portion corresponding to the magnet.

2. The mobile phone as claimed in claim 1, wherein the positioning device fixes the battery in a predetermined direction, and a predetermined angle is formed between the predetermined direction and a direction that the battery moves.

3. The mobile phone as claimed in claim 1, further comprising:
    an elastic member disposed on the second side of the frame to eject the battery.

4. The mobile phone as claimed in claim 1, wherein the body comprises a first connector on the second side, and the battery comprises a second connector corresponding to the first connector.

5. The mobile phone as claimed in claim 1, wherein the first guiding member is a flange, and the second guiding member is a groove.

6. A device for fixing a battery in an electronic device, wherein the electronic device comprises a body and a battery disposed in the body in a detachable manner, the body includes an U-shaped frame including a first side, a second side connecting to the first side, and a third side connecting to the second side, and the device comprises:
    a first guiding member integrally formed on the body;
    a second guiding member integrally formed on the battery, wherein the battery moves in the body by the second guiding member moving along the first guiding member; and
    a positioning device, disposed on the body, for fixing the battery in the body, wherein the positioning device is located on the first side or the third side, and the positioning device is a magnet.

7. The device as claimed in claim 6, further comprising:
    an elastic member disposed on the second side of the frame to removing the battery.

8. The device as claimed in claim 6, wherein the first guiding member is a flange, and the second guiding member is a groove.

* * * * *